No. 616,527. Patented Dec. 27, 1898.
C. J. DEMPSEY.
METHOD OF PRESERVING HAMS, &c.
(Application filed Apr. 9, 1898.)
(No Model.)
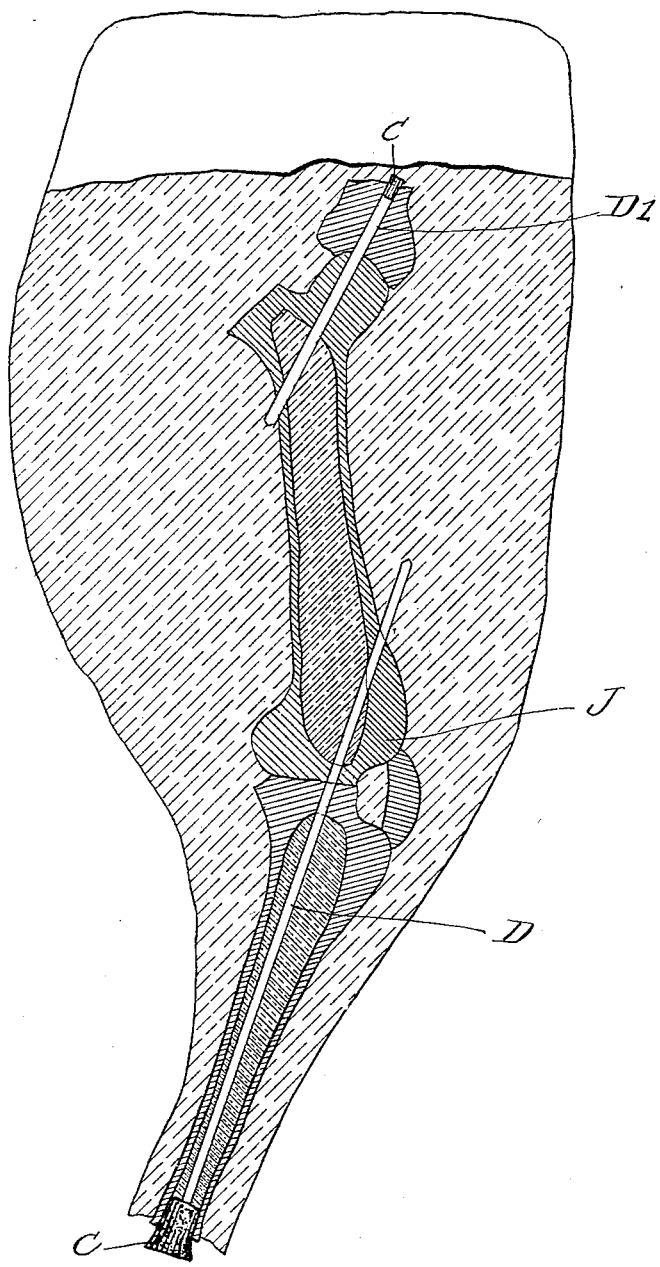
Witnesses:
Fred Borg
Wm. F. Henning
Inventor:
Charles J Dempsey
by W E Williams atty.

UNITED STATES PATENT OFFICE.

CHARLES JOSEPH DEMPSEY, OF CHICAGO, ILLINOIS.

METHOD OF PRESERVING HAMS, &c.

SPECIFICATION forming part of Letters Patent No. 616,527, dated December 27, 1898.

Application filed April 9, 1898. Serial No. 676,976. (No specimens.)

*To all whom it may concern:*

Be it known that I, CHARLES JOSEPH DEMPSEY, a citizen of the United States of America, and a resident of Chicago, Cook county, Illinois, have invented certain new and useful Improvements in Methods of Preserving Meat, of which the following is a specification.

It is well known that there is some difficulty in obtaining uniformly perfect results in curing hams and other large masses of meat having large jointed bones and that when unsatisfactory results are obtained the trouble seems to originate at the bone, and particularly at the joints rather than in the middle of the mass, because the difficulty with a mass of meat having such bones is far greater than with a similar mass without them. Some have concluded that the marrow is peculiarly susceptible to decomposing change and therefore should be scraped out in advance. Others have proposed to cook and remove it by steam, and still others have proposed to perforate the meat alongside the bone in order that the preservative liquid may more fully and quickly penetrate to its vicinity. I believe that the trouble arises from the fact that the dense tissues found with the bony structure are only very slowly penetrated by the preserving agent and that this is especially true of the parts at the joints. If this be correct, it is obvious that removing the marrow is at best but a partial remedy, or, so far as the joints are concerned, no remedy, and that perforation alongside the bones is of little more avail. To avoid any degree of cooking, which is objectionable, and to retain the most of the marrow, which is desirable, and at the same time to completely eliminate the evil under discussion, I perforate the outer or terminal bones from end to end in such manner as to form a passage from the exterior to the interior of each bone and each joint, whereby the preservative agent may pass immediately and in large quantity to the points of greatest danger, reaching both sectional and natural surfaces of the parts offering the greatest resistance to penetration.

In the accompanying drawing, which is diagrammatic, I have shown a section, in the central plane of the bones, of a ham cured in accordance with my invention, D D' being holes drilled through the bones and joints J and lying approximately in the axes of the terminal bones.

C C represent corks or the like stopping the outer ends, respectively, of the passages.

Preferably, the passages being drilled, as stated, I force in a preserving liquid by means of a pump and then seal the outer ends of the passages, thus curing the ham quickly and perfectly and with a comparatively small quantity of liquid.

What I claim is—

1. The method of curing hams and the like which consists in forming longitudinal passages in the terminal bones and through all the tissues of the joints at their inner ends, and then introducing a preserving agent into said passages.

2. The method of curing hams and the like which consists in passing a drill or the like longitudinally through the terminal bones and the joints at their inner ends, forcing a preserving liquid into the passages so formed, and then sealing the outer ends of the passages.

Signed by me this 5th day of April, 1898.

CHARLES JOSEPH DEMPSEY.

Witnesses:
W. E. WILLIAMS,
Mrs. M. E. MURPHY.